United States Patent [19]

Vinciguerra

[11] Patent Number: 4,753,319

[45] Date of Patent: Jun. 28, 1988

[54] EXHAUST SILENCER FOR HIGH-POWER GAS TURBINES

[75] Inventor: Costantino Vinciguerra, Florence, Italy

[73] Assignee: Nuovopignone S.p.A., Florence, Italy

[21] Appl. No.: 918,830

[22] Filed: Oct. 14, 1986

[30] Foreign Application Priority Data

Oct. 16, 1985 [IT] Italy ................................ 22508 A/85

[51] Int. Cl.⁴ ............................................... B64F 1/26
[52] U.S. Cl. ..................................... 181/218; 181/222
[58] Field of Search ................ 181/217, 218, 222, 224

[56] References Cited

U.S. PATENT DOCUMENTS

3,159,238 12/1964 Shearer ............................ 181/218 X
3,715,009 2/1973 Smith et al. ........................... 181/218

*Primary Examiner*—Benjamin R. Fuller
*Attorney, Agent, or Firm*—Hedman, Gibson, Costigan & Hoare

[57] ABSTRACT

Disclosed is an exhaust silencer for high-power gas turbines having an outer case made from steel plate formed into a Greek fret pattern, and proved with inner soundproofing panels of which are covered with standardized, insulating-soundproofing compound bricks. Each compound brick is preferably of square shape and include a front brick and a rear brick. The front brick is made from an annealed stainless steel plate, beveled at its corners, perforated in its central area only, and bent along each of its edges to form a bracket shape in cross section, inside which bracket-edged perforated steel plate is inserted a pad of insulating material of standardized dimensions, to act as an insulator-soundproofer made from very-high-quality materials subject for high temperature use. The second, rear brick, has a thickness approximately twice the thickness of the first brick, and is comprised of a thin plate of hardened stainless steel, forming a square frame with beveled corners, and with its front and rear edges bent to form a bracket shape in cross section, wherein the rear edge diverges outwardly to provide a spring-like resistance of the square frame against the steel plate of the outer case which it abuts, which bracket-edged square frame contains an insulating-soundproofing pad made from materials suitable for medium temperatures, and hence of lower quality.

7 Claims, 5 Drawing Sheets

EXHAUST SILENCER FOR HIGH-POWER GAS TURBINES

FIELD OF THE INVENTION

The present invention relates to an exhaust silencer for high-power gas turbines. By adopting a soundproofing and insulating coating system comprised of compound insulating bricks having small and standardized dimensions, which compound bricks are thick and free from welds and which allow suitable differentiation of the soundproofing and the insulation materials in the thickness dimension, an exhaust silencer of high efficiency, long life and low cost is obtained.

BACKGROUND OF THE INVENTION

Exhaust silencers for high-powered gas turbines present great technical and financial problems in that, because they must withstand exhaust gases which reach temperatures on the order of 500° C. and which generally contain corrosive compounds, such exhaust silencers must be necessarily made from stainless steel and other valuable and hence expensive materials. Furthermore, the low noise levels required by regulations oblige plant designers to adopt silencers of larger overall dimensions, the cost of which is not only the cost of the equipment, but the total cost with time, i.e., connected to the life of components, and to the costs deriving from the turbine shut down times necessary for maintenance and servicing operations.

Several types of silencers are already known which consist essentially of an outer case of normal steel covered internally with large insulating and soundproofing panels and housing in its interior aligned rows of vertical structures intended for supporting the large soundproofed panels, which dampen the pressure pulsations (and hence the noisiness) of gases passing through them.

Each of said large coating panels, provided both on the inner walls of the outer case and on the inner rows of support structures, is attached to the wall, by either welding or fastening (e.g., by riveting), a large plate of perforated high-temperature-withstanding stainless steel on a large-size rectangular supporting frame containing in its interior a pad of resistant cloth, full of fibrous soundproofing and insulating material such as mineral wood.

Now then, all the silencers of the prior art show severe drawbacks, which substantially lead to a short service life, in turn requiring frequent replacements and consequent frequent shut-down of the turbine unit, adding considerable overall costs.

The flue gases exit the gas turbine exhaust at high temperatures and with considerably high speeds, tubulences and pressure pulsations. This generates high vibrations and resonances on the perforated-plate walls of the panels which, being of large dimensions, are not very rigid. Because of such a poor stiffness, fatigue breakages occur at the weakest points, which are generally the edges of the perforated plates, where they are fastened or welded to the support frames, or in their central points, where the highest deformations occur.

Breakage at the edges of these large panels is also caused by temperature stresses, both under steady-state running conditions, and under transient conditions (turbine start-up and shut-down), resulting from deformations of the support frames for the perforated steel plates. Such deformations are caused by the high differences in temperature which occur between the perforated stainless steel plate, (which has a low thermal inertia and is directly licked at high speed by the hot exhaust gases) and the underlying support frame of iron (which, being very thick in order to accommodate the insulating-soundproofing pad, is directly heated, and shows a high thermal inertia). Furthermore, in case of a wall panel, said support frame is also directly adjacent, on its outer surface, to the cold support structure of the outer case.

From these breakages, which are often not immediately seen from the outside, much more serious consequences follow rapidly, such as the lifting of the edges of the perforated plates, their subsequent detachment and the consequent loss of insulating material.

Another drawback connected to the large dimensions of the generally rectangular panels is that the panels undergo, between low and high temperatures, large dimensional changes, on the order of several centimetres, so that, besides particular and sophisticated fastening systems for said panels having to be adopted to allow such great expansions to occur (often decreasing the rigidity of the whole structure), it also becomes necessary to leave large clearances, of several centimetres, between adjacent panels. These clearances disappear at high temperature, but they are very dangerous under transient running conditions, because the spaces make it possible for the gas to infiltrate between the panels and heat their sides in differential fashion relative to each other. In addition, these large panels require pads filled with insulating and/or soundproofing material, also of large dimensions, so that packing of the fibrous material frequently occurs which, due to the effect of gravity and of the gas pulsations, tends to move material towards the bottom of the pad, thus leaving empty and therefore ineffectual the upper portions, in which the considerable and anomalous temperature increases eventually create conditions which shorten still further the life of the structural parts.

A very serious further drawback of prior art silencers is represented by the difficulty, and near impossibility, of testing the structure of the panels and their contents.

These difficulties are connected with the considerable area of the surfaces to be checked, and the fact that the silencer devices are not manufactured in series according to standardized processes but generally as sets of a few units, often differing from each other because of the different soundproofing requirements and because of the relatively undefined manufacturing techniques in large structural steel manufacturing workshops.

Finally, a further drawback arises from injudicious and expensive use of the insulating and soundproofing material in the thick pads inserted in the wall panels, inasmuch as these panels are filled with one single type of material, which material must perform different functions at different distances from the surface contacting the exhaust gases. In fact, starting from the surface contacting the hot gases, the first portion of material must withstand high temperatures and perform functions both of acoustical damping and of thermal insulation, whereas on the side facing the cold walls of the outer case, the material must only perform insulating functions and the resistance to high temperatures is therefore not required.

SUMMARY OF THE INVENTION

The purpose of the present invention is precisely obviating the aforementioned drawbacks, and of to provide an exhaust silencer for high-power gas turbines which is compact, highly efficient, long lived and therefore very favourable from the economic point of view.

Such a purpose is substantially achieved in that the inner walls of the silencer body, as well as the aligned sets of vertical support structures thereof are coated by one single type of soundproofing and insulating panel, constituted by a compound, standardized insulating brick of small dimensions and of preferably square shape, which has a high stiffness and is weld-free, with differentiated insulating and soundproofing components layered in relation to the surface contacting the exhaust gases. Each compound brick is kept in its position, while being free to expand, together with the bricks adjacent to it, by four special insulated hollow fastening pins of stainless steel, one pin securing each of its corners.

In accordance with the present invention, not only have the drawbacks relating to the panel dimensions and the panel stiffness been eliminated, but also the production of bricks with uniform and controlled characteristics is made possible.

More particularly, the aforementioned compound insulating brick is subdivided into two mating bricks, of different thickness. The front brick, which comes in contact with the exhaust gas at about 500° C., is comprised of a plate of annealed stainless steel and of square shape, previously perforated with a set of small bores in its central area and not on its edges, which is fabricated to form on the periphery of the perforated square plate a continuous bent edge and beveled at the four corners of the square plate, to avoid excessive reductions in thickness during the pressing, and to create a free channel between adjacent bricks, to accommodate the insulated hollow fastening pins which clip the compound bricks to the supporting structure. The four edges of the perforated square plate are bent inwards along the four sides, to a position parallel to the plane of the perforated plate, so as to create an edge having a bracket-shaped cross section, forming a box-like holder, inside which a pad of soundproofing and insulating material, such as mineral wool, inside an envelope of high-temperature-withstanding cloth, is inserted. The insulating-soundproofing pad is kept in position by a set of undulated strips or bands of stainless steel in a criss-cross pattern which are spot-welded to each other at their crossings and to the bent lips of the bracket edges. The criss-crossed strips allow the passage of the gas pressure pulsations to be damped and guarantee the required flexibility to compensate for the considerable elongations of the perforated plate (which is exposed to the highest temperatures).

A sort of square "tambourine" is thus obtained, in which the surface of the perforated plate ends, without discontinuities and without welds, in a bent bracket-shaped edge, forming a box-like frame. This frame has a thickness equal to ⅓ of the thickness of the frame of the prior art, however it is extraordinarily rigid and provides the optimal condition of edge elastic fastening. Furthermore, since the bracket edge is of the same thickness as the perforated plate, is in perfect continuity therewith, and has a small thermal inertia during the transients, strong thermal stresses (which, as already discussed, are among the most important causes of breakage of the panels of the prior art) are not generated on the edges. On the other hand, due to the reduced thickness of the first (front) brick, and to the resulting small dimensions of the insulating-soundproofing pad, it will be be possible to use soundproofing and insulating materials of higher quality without increasing costs. Alternatively, if the same materials are used, considerable savings in costs shall be achieved.

The rear brick, which, together with the front brick compose the compound insulating brick, must operate at relatively low temperatures, due to the temperature drop accomplished by the effective insulation of the front brick (which is in direct contact with the hot gases). The rear brick comprises a low-thickness plate of hardened stainless steel, bent to form a square frame, beveled at its four corners similarly to the front brick. The front and rear edges of the square frame of the second (rear) brick are bent to form a substantially bracket-shaped cross section, the front lips of which are parallel to and rest on the corresponding rear lips of the bracket-shaped edge of the front brick. The rear lips of the second brick are slightly divergent outwards, and apply a spring-like force against the wall to which the insulating-soundproofing bricks are secured. This spring-like resistance confers to the whole system of the two bricks which constitute the compound insulating brick elastic characteristics, in the direction perpendicular to the perforated surface of the front brick, and such elasticity allows an elastically precompressed assemblage of the said bricks, to compensate, under normal running conditions, and transient conditions, for the differential thermal expansions between the fastening pins and the bricks. The ability to compensate for thermal expansions avoids troublesome clearances between bricks and the risk of vibrations and resonances, which frequently cause fatigue breakages in the panels of conventional silencers.

Inside the square frame of the rear brick there is inserted a pad filled with soundproofing-insulating material. This pad is kept in its position frontally by a set of undulated strips or bands of criss-crossed stainless steel, spot-welded to each other at their crossings and to the vertical front lips of the same frame, and is secured rearwardly by a plate of zinc-plated steel bounding the square frame. The pad filled with soundproofing-insulating material may withstand lower temperatures than the front brick and hence the soundproofing-insulating material may be of considerably lower quality and cost than the pad of the front brick. This offsets the high cost of the front brick insulating material, and also provides a further rear layer of a material having prevailingly insulating or nonconducting characteristics. This material may be of spongy type rather than of fibrous type, which, because it does not have a tendency to get packed, constitutes a further safety advantage.

In addition, inasmuch as the front and rear bricks are exposed to different temperatures and thus undergo different thermal deformations, the thickness of the front brick can be less than that of the rear brick.

Furthermore, the compound insulating bricks as disclosed do not coat the inner walls of the outer body or case of the silencer only; they also coat the inner rows of vertical soundproofing structures, although it may be convenient to only mount on these latter structures the front brick portion of the compound bricks, in that for these internal structures immersed in the gas flow, it is clear that the same insulation problems which must be met by the silencer body walls are not present.

According to another characteristic of the present invention, the walls of the outer body or case of the silencer are fabricated from a plate of normal steel, bent to a Greek fret pattern, with a constant pitch equal to half the width of a compound insulating brick, and with the generatrices of the Greek fret being placed vertically.

This configuration provides the twofold advantage of having a considerable rigidity in the vertical direction, and high heat dissipation as compared to flat walls. The structural rigidity inherent in the Greek fret design makes it possible to support on the exhaust silencer further pieces of equipment, such as additional stacks and means for recovering heat from the exhaust gases, while at the same time preserving elastic characteristics in the axial direction. With this wall design, furthermore, nearly twice as much heat is dissipated to the outside compared to a flat wall, which is very useful in order to secure low temperatures on the outer body or case of the silencer. This in turn reduces thermal expansions, preserving the good mechanical characteristics of the material which constitutes the structure.

The compound insulating bricks are finally firmly fastened to the structure, in such a way as to permit free expansion, by means of special insulated hollow pins which, due to their special and novel shape and their standardized in-series manufacturing, not only guarantee increased safety but also show a high insulating and soundproofing capability.

Each fastening pin, according to a further characteristic of the present invention, comprises a tubular hollow body, made from low-conductivity stainless steel, extending outwards in its front portion (which must come in contact with the hot gas) into an annular rim obtained by pressing. This rim acts as a stop shoulder for the compound bricks, preventing them from falling away from the silencer wall. This method of securing the compound bricks, being weld-free, permits the bricks to withstand radial cracks which arise owing to thermal shocks. Said annular rim is coated with a cover of stainless steel, turned by drawing onto the lower portion of the rim. This stainless steel cap has the triple function of protecting the annular rim from the hot gas, acting as a retaining element for the bricks, so that they cannot get detached in case of partial breakage of the rim, and finally retaining the insulating and soundproofing material with which the hollow of the pin is filled. Use of the insulated fastening pins avoids the presence of holes in the coating of insulating-soundproofing bricks inside the silencer, preventing the escape of noise and preventing the heat transmission by irradiation. In addition, the cover of bricks can freely expand radially, and hence does not undergo thermal stresses.

The rear portion of the hollow tubular body (filled with insulating and soundproofing matter) of each fastening pin, viz., practically, that portion in which temperature is always low, terminates with a steel bolt, which allows the pin to be fastened onto the supporting structure. Consequently, the compound insulating bricks are, in turn, fixedly fastened onto said structure.

BRIEF DESCRIPTION OF THE DRAWINGS

The invention is now clarified with reference to the attached drawings, which illustrate a preferred form of practical embodiment. The drawings are provided for the purpose of exemplifying and not for limiting the invention, inasmuch as thermal, technological and structural variants can be supplied at any time, always within the scope of the present invention. In said drawings.

DESCRIPTION OF THE PREFERRED EMBODIMENT

Figure 1:
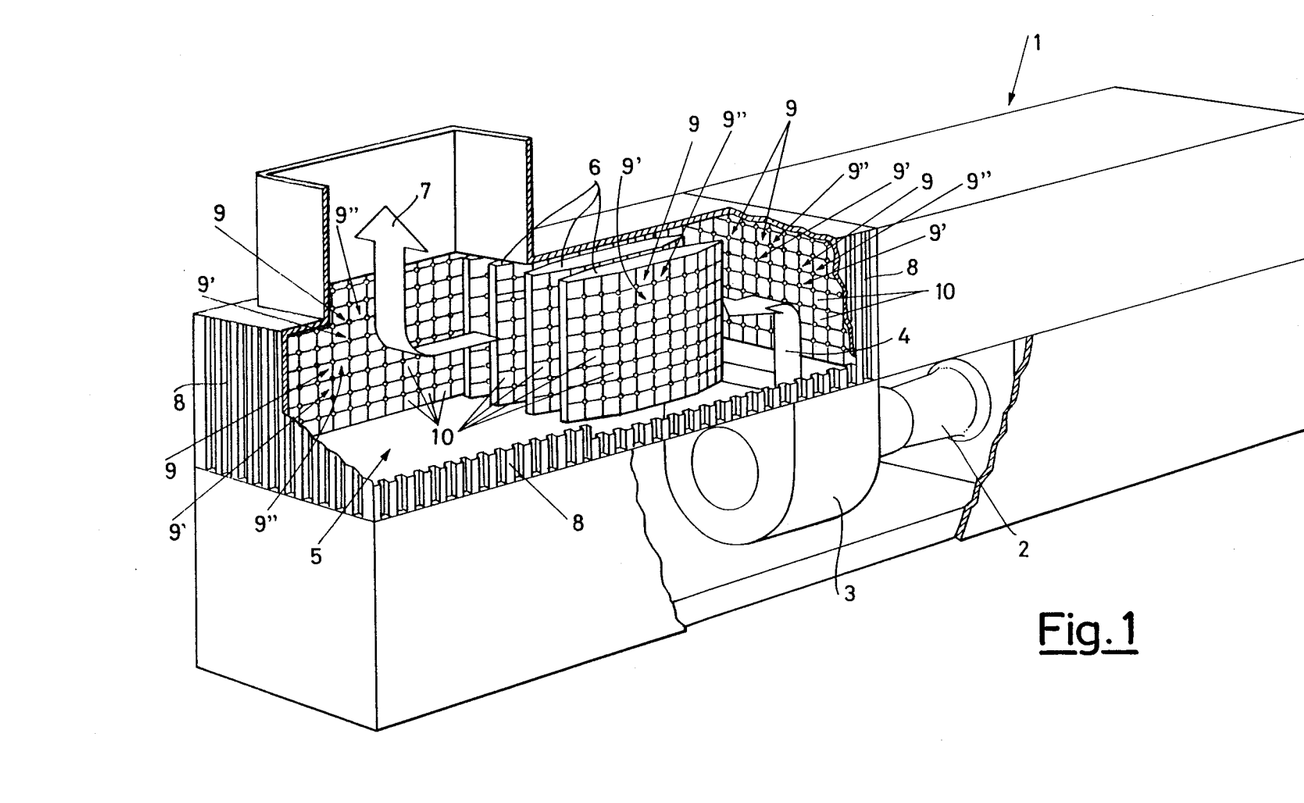
FIG. 1 shows a partly sectional perspective view of a high-power gas-turbine adopting an exhaust silencer according to the invention.

Referring to the figures, item 1 of FIG. 1 indicates the case enclosing the whole high-power gas turbine, wherein the exhaust gases from the power turbine 2 are conveyed through the exhaust box 3 and are directed, according to arrow 4, to the lower end of the exhaust silencer 5. The exhaust gases pass through aligned rows of vertical support structures 6, and are exhausted upwards, according to arrow 7, at the other end of the exhaust silencer 5.

Said exhaust silencer 5 is substantially constituted by a horizontal-axis parallelepipedal outer body or case (see item 5 in FIG. 1), and is provided with side walls 8 fabricated from steel plate bent to a Greek fret pattern (see item 8 in FIG. 2), with the generatrices of the Greek fret being arranged in a vertical fashion, and with a constant pitch equal to half the width of a coating insulating and soundproofing panel 9, 9' and 9". The roof and the floor of the cases are also made from steel plates bent to a Greek fret pattern, with the generatrices of the Greek fret being perpendicular to the silencer axis.

Figure 2:
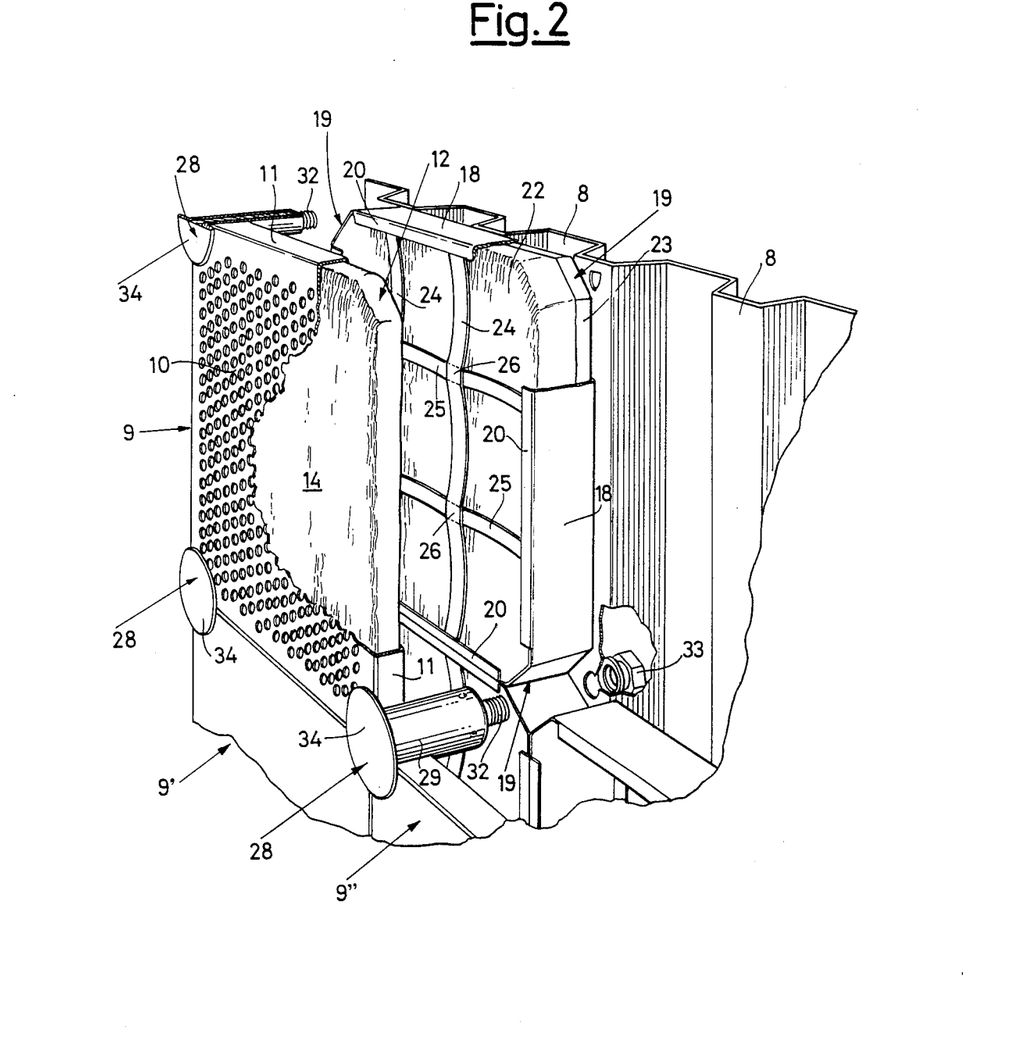
FIG. 2 shows an exploded and partly sectional perspective view of the compound insulating brick according to the invention.

Said panels are accomplished by using compound insulating bricks 9, 9' and 9", standardized to a square shape and in small dimensions, each of them comprising an assembly of two mating bricks different in thickness from each other (see, FIG. 2).

Figures 3, 4:
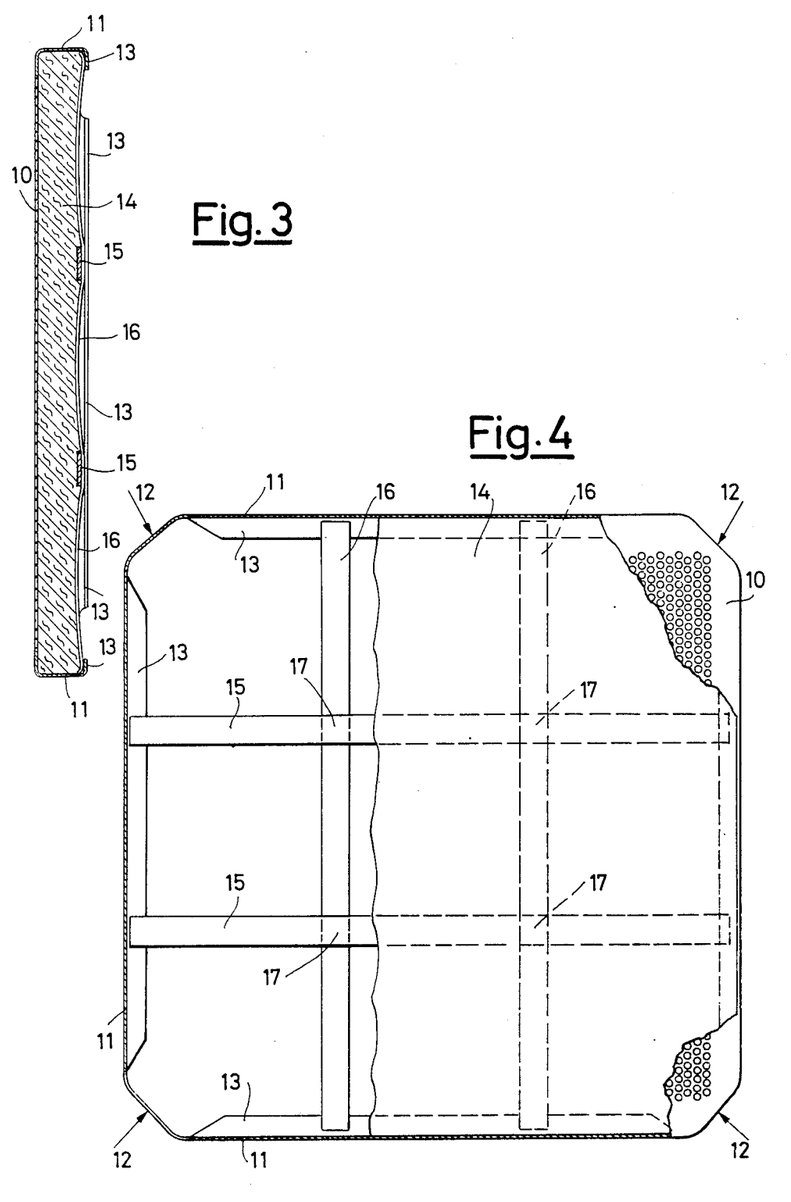
FIG. 3 shows a side sectional view of enlarged scale of the front brick of the compound insulating brick of FIG. 2.
FIG. 4 shows a partly sectional view of the front brick of FIG. 3.

The front brick is constituted by a plate of annealed stainless steel 10 or 10', of square shape, and perforated in its central portion, but not in correspondence of its edges, which are bent to form an adjacent bent edge 11 or 11', with bevelings 12 at the four corners of the square piece (see FIG. 4).

Said adjacent edge 11 or 11' is then bent inwards along the four sides, to form lips 13 or 13' parallel to the plane of the perforated plate 10 or 10', thereby forming a box-like holder or frame, having an edge with a substantially bracket-shaped cross section (see FIG. 3).

The said box-like holder is then filled with a pad of high-temperature resistant cloth 14 or 14', containing soundproofing and insulating material, such as mineral wool, which pad 14 or 14' is kept in its position by the undulated strips or bands 15 and 16 of stainless steel, spot-welded to each other at their crossings 17 and to the lips 13 of the frame (see FIGS. 3 and 4).

The rear brick is made from a plate of low-thickness hardened stainless steel 18 or 18', bent to form a square frame (see item 18 of FIG. 2) with bevelings 19 at their corners analogous to the bevelings 12 of the front bricks. The rear bricks have a thickness approximately twice the thickness of the front brick, and, similarly to the continuous bent edge 11 or 11' of the front brick, the front and rear edges of the frame 18 are bent to form perpendicular lips 20 and 21 giving frame 18 a substantially bracket-shaped cross section.

Figures 5, 6:
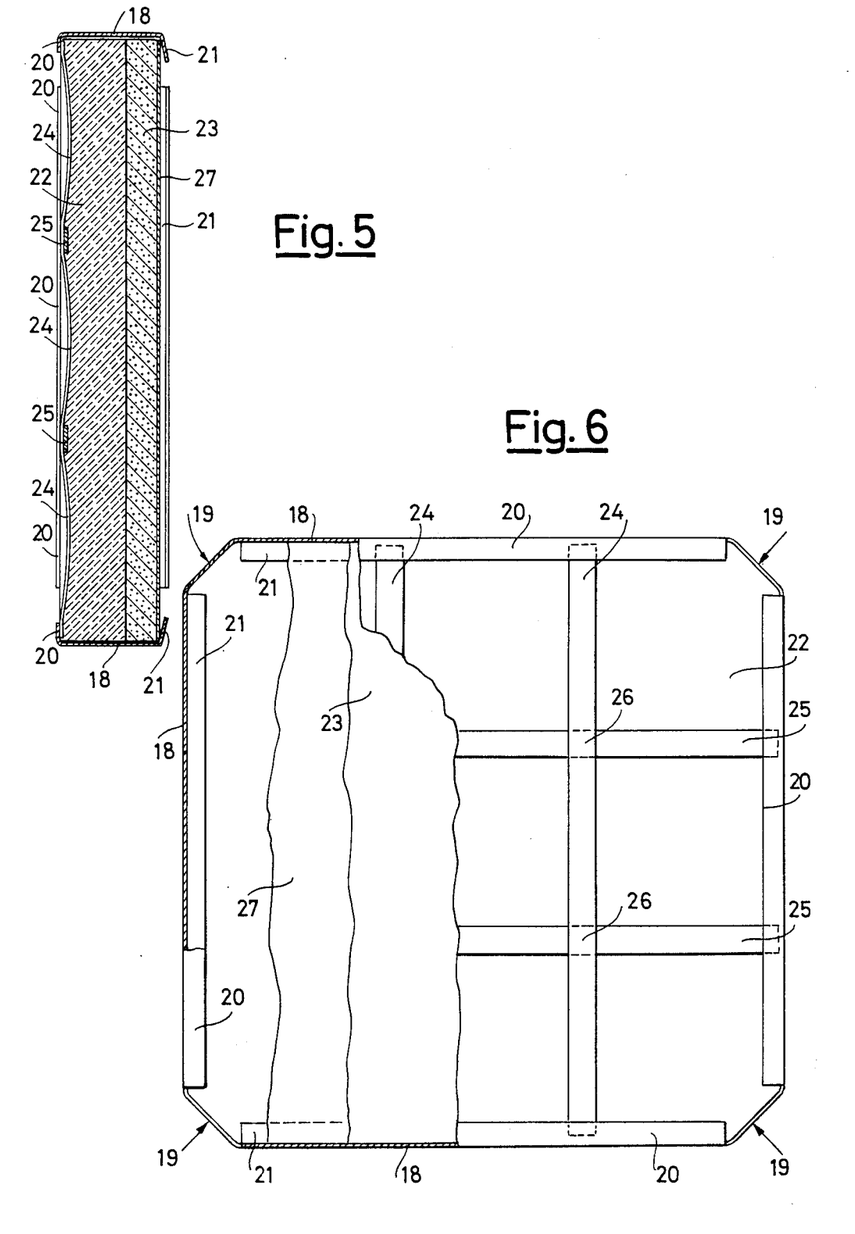
FIG. 5 shows a side sectional view on enlarged scale of the rear brick of the compound insulating brick of FIG. 2.
FIG. 6 shows a partly sectional plan view of the rear brick of FIG. 5.

The front lips 20 of said frame 18 are vertically arranged, and they come to rest on the corresponding rear lips 13 or 13' of the front brick (see FIG. 8), while the rear lips 21 (see FIGS. 5 and 8) are slightly divergent outwards, for the purpose of resting against the wall 8 or 6 to be soundproofed or insulated and applying a spring-like force against it. A pad 22 or 22', filled with soundproofing and insulating material fit for lower temperatures, as well as a further rear layer 23 or 23' of a material having prevailingly insulating characteristics, of spongy type, fill the above said square frame 18 or 18'. The soundproofing and insulation layers of the rear brick are kept in their position frontally by the undulated strips or bands 24 and 25 of the stainless steel, spot-welded to each other at their crossings 26 and to the front vertical lips 20 of the same frame, and rearwardly by a plate of zinc-plated steel 27.

Figure 8:
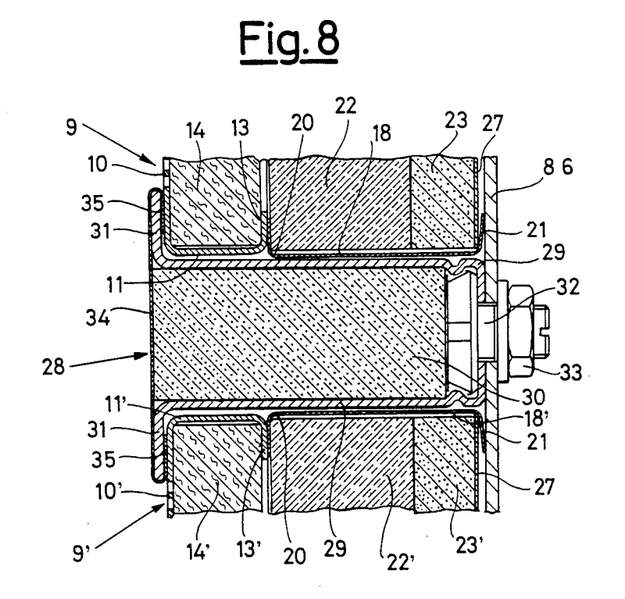
FIG. 8 shows a side sectional view of the pin of FIG. 7, properly assembled.

As can be clearly seen in FIG. 8, the rear brick is longer, by the length Δ, than the front brick, because the front brick, by undergoing higher temperatures, must expand to a greater extent.

The assembly of the two bricks which make up the compound brick 9 is then firmly held in its position by insulated fastening pins 28, which are inserted at the openings formed because of the bevelings 12 and 19 of the brick corners.

Figure 7:
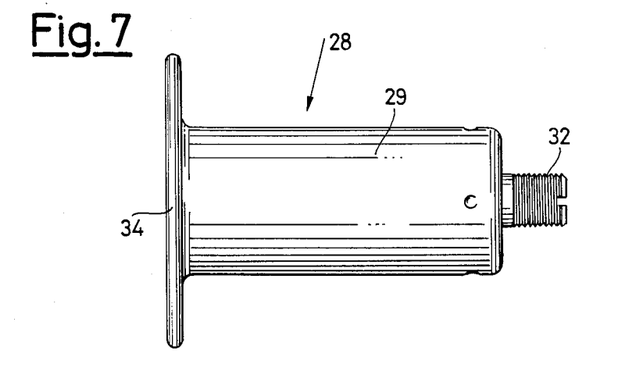
FIG. 7 shows a side view of the insulated hollow fastening pin according to the invention.

Each pin 28 comprises (see specifically FIGS. 7 and 8) a hollow tubular body 29 of low-conductivity stainless steel which is filled with insulating and soundproofing material 30 and projects outside in its front portion, forming an annular shoulder rim 31. Each pin 28 if further provided with a steel bolt 32 for the purpose of fastening said pin 28, by a nut 33, to the element 8 or 6 to be insulated and soundproofed. The annular shoulder rim 31 is finally coated and protected by a cover of stainless steel 34, turned, by drawing, with its ends 35 onto the lower portion of the said rim.

I claim:

1. An exhaust silencer for high-power gas turbines, comprising a parallelepipedal outer case having a port for the entrance of exhaust gases and a port for the exit of exhaust gases, and having a plurality of aligned vertical support structures enclosed within said outer case, wherein the interior surfaces of said outer case and the surfaces of said support structures are covered by a multiplicity of insulating and soundproofing panels, wherein
   at least the panels covering the interior surfaces of said outer case are compound insulating-soundproofing bricks having standardized dimensions and a substantially square shape, each compound insulating-soundproofing brick consisting essentially of mating front and rear bricks, different in thickness from each other, wherein
   (a) said front brick comprises
      (1) a plate of annealed stainless steel of substantially square shape having beveled corners and a plurality of perforations in the central portion of said plate not extending to the edges thereof, wherein the edges of said perforated stainless steel plate are bent along the periphery on all sides to form an edge having a substantially bracket-shaped cross section, thereby defining a perforated box-like frame;
      (2) a pad of high-temperature-resistant cloth filled with soundproofing and insulating material inserted within said box-like frame;
      (3) a series of undulated bands of criss-crossed stainless steel spot-welded to each other at their crossings and to the bracket-shaped edge of said perforated stainless steel plate, said criss-crossed bands and said stainless steel plate enclosing and confining said pad, which substantially fills the enclosure defined thereby; and wherein
   (b) the rear brick comprises
      (1) a strip of low-thickness, hardened stainless steel fabricated to form a substantially square frame having beveled corners of the same approximate planar dimensions as said front brick but having a thickness approximately twice the thickness of said front brick, wherein the front and rear edges of said square frame are bent perpendicular to said square frame on all sides to provide front and rear lips and to provide a square frame having a substantially bracket-shaped cross section, said rear lips projecting outward so as to provide spring-like resistance when said rear lips are compressed inwardly;
      (2) undulated bands of criss-crossed stainless steel spot-welded to each other at their crossings and to the front lips of said square frame;
      (3) a plate of zinc-plated steel bounded by the edges of said stainless steel strip;
      (4) a pad inserted within the box-like space defined by said square frame, the stainless steel bands welded thereto, and said zinc-plated steel plate, said pad being filled with soundproofing and insulating material; and
      (5) a further layer of spongy insulating material immediately adjacent said pad and also enclosed within said box-like space;
   wherein said insulating and soundproofing panels are fixed to the interior surface of the outer case or to said vertical support structures by elongated hollow fastening pins fixed at one end to said interior surface or support structure and extending between adjacent insulating and soundproofing panels through the space created by the aligned beveled edges of said front and rear bricks, the distal end of said fastening pin being flattened to form a shoulder rim overlapping and securing one or more of said panels, which fastening pins are further filled with insulating material.

2. An exhaust silencer according to claim 1, wherein the walls of said outer case of the silencer are made of normal steel plates bent to a Greek fret pattern, with a constant pitch equal to half the width of one of said compound insulating bricks and with the generatrices of the Greek fret being positioned vertically in the side walls and perpendicularly to the longitudinal axis of the exhaust silencer on the floor and roof thereof.

3. An exhaust silencer according to claim 1, wherein insulating and soundproofing panels are secured as well to the aligned vertical support structures.

4. An exhaust silencer according to claim 3, wherein the insulating and soundproofing panels secured to the vertical support structures are insulating-soundproofing bricks comprising a front brick (a).

5. An exhaust silencer according to claim 1, wherein the planar dimensions of said front brick are slightly smaller than the planar dimensions of said rear brick in order to accommodate the differential thermal expansion of the bricks.

6. An exhaust silencer according to claim 1, wherein each of said elongated hollow fastening pins further comprise a tubular hollow body of low-conductivity stainless steel having a steel bolt at its proximal end securing said pin, by means of a nut, to said outer case or support structure, and wherein the flattened distal end forms an annular shoulder rim having a stainless steel cap drawn over said rim and extending between said rim and the edge of said perforated stainless steel plate.

7. A compound insulating-soundproofing brick consisting essentially of mating front and rear bricks, different in thickness from each other, wherein
   (a) said front brick comprises
      (1) a plate of annealed stainless steel of substantially square shape having beveled corners and a plurality of perforations in the central portion of said plate not extending to the edges thereof, wherein the edges of said perforated stainless steel plate are bent along the periphery on all sides to form an edge having a substantially bracket-shaped cross section, thereby defining a perforated box-like frame;
      (2) a pad of high-temperature-resistant cloth filled with soundproofing and insulating material inserted within said box-like frame;
      (3) a series of undulated bands of criss-crossed stainless steel spot-welded to each other at their crossings and to the bracket-shaped edge of said perforated stainless steel plate, said criss-crossed bands and said stainless steel plate enclosing and confining said pad, which substantially fills the enclosure defined thereby; and wherein
   (b) the rear brick comprises
      (1) a strip of low-thickness, hardened stainless steel fabricated to form a substantially square frame having beveled corners of the same approximate planar dimensions as said front brick but having a thickness approximately twice the thickness of said front brick, wherein the front and rear edges of said square frame are bent perpendicular to said square frame on all sides to provide front and rear lips and to provide a square frame having a substantially bracket-shaped cross section, said rear lips projecting outward so as to provide spring-like resistance when said rear lips are compressed inwardly;
      (2) undulated bands of criss-crossed stainless steel spot-welded to each other at their crossings and to the front lips of said square frame;
      (3) a plate of zinc-plated steel bounded by the edges of said stainless steel strip;
      (4) a pad inserted within the box-like space defined by said square frame, the stainless steel bands welded thereto, and said zinc-plated steel plate, said pad being filled wtih soundproofing and insulating material; and
      (5) a further layer of spongy insulating material immediately adjacent said pad and also enclosed within said box-like space.

* * * * *